Jan. 26, 1971     H. L. HALPERT     3,558,766

PROCESS FOR PRESERVING BIOLOGICAL SPECIMENS

Filed Sept. 30, 1965

INVENTOR

Harold L. Halpert

United States Patent Office

3,558,766
Patented Jan. 26, 1971

3,558,766
PROCESS FOR PRESERVING BIOLOGICAL SPECIMENS
Harold L. Halpert, 1007 Downs Drive, Silver Spring, Md. 20904
Filed Sept. 30, 1965, Ser. No. 491,742
Int. Cl. B29c 6/02, 9/00
U.S. Cl. 264—275      4 Claims

ABSTRACT OF THE DISCLOSURE

A process for embedding a biological specimen in plastic to avoid handling a dry fragile specimen. In one form of the invention the specimen is supported in lumps of plastic and is dried while so supported. The lumps are then partially dissolved by a monomer of the plastic and then polymerized. In a second form of the invention the specimen is supported and dried on a sheet of plastic and then a mixture of a monomer and polymer is poured over the specimen and the mixture polymerized.

---

This invention relates to a process for preserving biological specimens and more particularly to a process for preserving biological specimens in a synthetic plastic.

Biological specimens have been preserved by embedding in synthetic plastics but the known processes require the plastic to be applied in thin layers and/or require the specimen to be handled while in a frangible condition. The handling of flowers and winged insects such as butterflies for example when in a frangible condition is hazardous and the slightest mishap can cause destruction of the specimen.

It is an object of this invention to produce a process for embedding biological specimens in a synthetic plastic which will eliminate the necessity for building the material about the specimen, one layer at a time, till the article being made is completed.

It is a further object of this invention to produce a process for embedding biological specimens in a plastic which will eliminate the necessity for handling a fragile specimen.

It is a further object of this invention to produce a process as aforesaid which will avoid damage to the specimen due to the shrinkage of the plastic during the setting thereof.

These and other objects of the invention will be manifest upon reading the following explanation in conjunction with the accompanying drawings wherein.

In accordance with one form of the invention a selected specimen is embedded in lumps of the polymer of the selected plastic and dried in situ. When the specimen has been dried the monomer of the plastic is added to fill the spaces between the lumps and allowed to dissolve at least the boundary or surface layers of the lumps and the monomer of the mass is then polymerized.

In accordance with another form of the invention a selected specimen is layed on a sheet of plastic and a mixture of a monomer and polymer of the plastic is poured over the specimen and the monomer of the mixture is then polymerized.

The resultant product is a specimen embedded in plastic with no boundary layers visible in the finished product and which product is a specimen embedded in a clear glass-like plastic.

Figure 1:
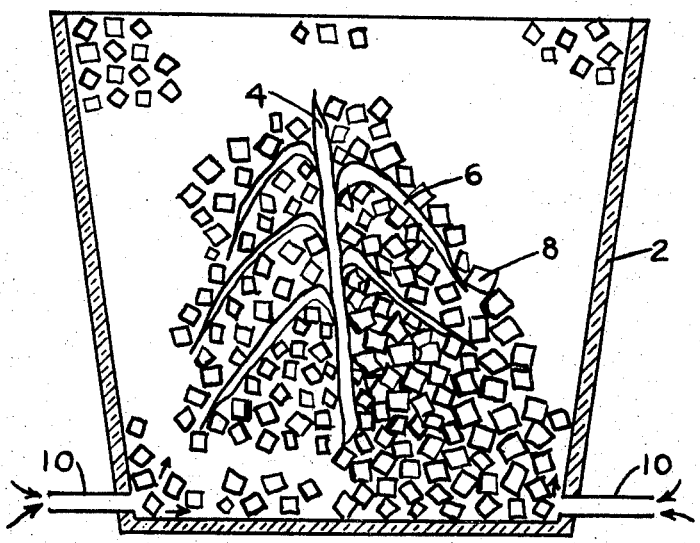
FIG. 1 illustrates the specimen in position to be dried and embedded.

With reference to the drawing there is shown in FIG. 1 a container 2 made of glass but which could be of any material that will not be attacked by the monomer of the plastic to be used. The specimen to be embedded is shown as having a stalk 4 and leaves 6 but any other specimen such as a flower could also be used. The specimen is embedded in lumps of methyl methacrylate 8 with the lumps arranged to support the leaves in the position to be assumed in the finished product. In the event a flower is used the lumps are positioned between the petals and between the other elements which are to be in spaced relation so that all elements are in the position desired in the completed mount. When the specimen is positioned as indicated it is dried by passing a drying atmosphere through the mass. In the apparatus illustrated sufficient air can pass to the mass through conduits 10 as illustrated by the arrows and brought in contact with the specimen. Faster drying can be obtained by pumping dry air through the conduits. When the specimen is dehydrated a monomer of methyl methacrylate is admitted into the container through conduits 10 to fill the spaces between the lumps. The monomer will then partially dissolve the lumps to form therewith a syrup-like mass after which the mass is subjected to polymerizing heat or light. Upon completion of polymerization the glass or other container can be separated from the completed mount by breaking it if necessary.

Figure 2:
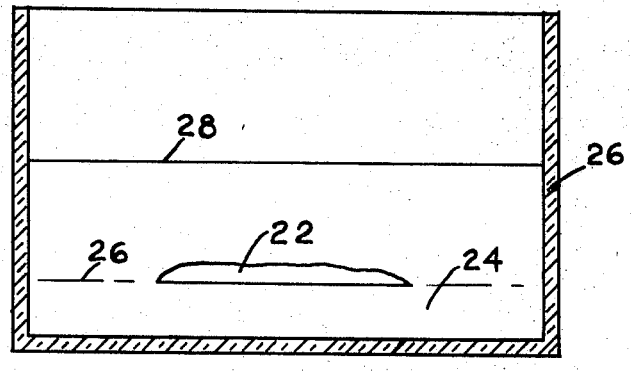
FIG. 2 illustrates a modified process.

In the form of the invention illustrated in FIG. 2, the specimen 22 is placed on a layer of methyl methacrylate 24 supported in a glass container 26. The specimen can be dehydrated in the position shown. A casting syrup is made by dissolving the polymer of methyl methacrylate in the monomer and then poured over the specimen to the desired depth indicated by the free surface 28. The monomer of the syrup will dissolve the boundary layer of the layer 24 as indicated by the broken line 26 and the mass is then subjected to polymerizing heat or light to polymerize the monomer. Upon completion of polymerization the container and mount can be separated by breaking the container, if necessary. The use of a syrup of the monomer and polymer prevents the specimen from floating and substantially reduces shrinkage whereby possible damage to the specimen is avoided.

While methyl methacrylate has been given as an example of the material which can be used other materials such as ethyl methacrylate or styrene can also be used. Also any suitable method for drying the specimen can be used in lieu of the drying atmosphere described.

The syrup of monomer and polymer is useful in casting of any shape since the shrinkage of the syrup is almost negligible in passing into the polymerized state.

I claim:

1. A method for embedding a biological specimen in a plastic comprising the steps of embedding the specimen in lumps of plastic, drying the specimen while so embedded, adding a monomer of the plastic to fill the spaces between the lumps and to partially dissolve the lumps, and then polymerizing the mass.

2. A method for embedding a biological specimen in a plastic comprising the steps of embedding the specimen in lumps of plastic, drying the specimen while so embedded by passing a drying atmosphere thereover, filling the spaces between the lumps with a monomer of the plastic to partially dissolve the lumps, and then polymerizing the mass.

3. A method for embedding a flower in a plastic comprising the steps of embedding the flower in lumps of plastic with the lumps between the flower elements to hold the elements in a preselected position, drying the flower while so embedded, adding a monomer of the plastic to fill the spaces between the lumps and to partially dissolve the lumps, and then polymerizing the mass.

4. A method for embedding a flower in methyl methacrylate comprising the steps of embedding the flower in lumps of methyl methacrylate polymer with the lumps arranged between the flower elements to hold the elements in a preselected position, drying the flower while so embedded by passing a drying atmosphere thereover, filling the spaces between the lumps with the monomer of methyl methacrylate whereby the lumps become partially dissolved, and then polymerizing the mass.

References Cited

UNITED STATES PATENTS 3,411,481  11/1968  Isreeli et al. _____ 118—500

ROBERT F. WHITE, Primary Examiner

J. H. SILBAUGH, Assistant Examiner

U.S. Cl. X.R.

264—247